United States Patent
Nguyen (10) Patent No.: US 7,036,042 B1
(45) Date of Patent: Apr. 25, 2006

(54) DISCOVERY AND ISOLATION OF MISBEHAVING DEVICES IN A DATA STORAGE SYSTEM

(75) Inventor: Tom Nguyen, San Jose, CA (US)

(73) Assignee: 3PARdata, Fremont, CA (US)

( * ) Notice: Subject to any disclaimer, the term of this patent is extended or adjusted under 35 U.S.C. 154(b) by 481 days.

(21) Appl. No.: 10/222,390

(22) Filed: Aug. 16, 2002

(51) Int. Cl.
G06F 11/00 (2006.01)

(52) U.S. Cl. .................. 714/7; 714/4; 398/2; 398/3; 370/221; 370/222; 370/223

(58) Field of Classification Search ............. 714/7; 398/2, 3; 370/221–223
See application file for complete search history.

(56) References Cited

U.S. PATENT DOCUMENTS

| | | | | |
|---|---|---|---|---|
| 5,548,712 | A * | 8/1996 | Larson et al. ............... | 714/7 |
| 6,571,354 | B1 * | 5/2003 | Parks et al. ................ | 714/7 |
| 6,600,727 | B1 * | 7/2003 | Mackay ..................... | 370/293 |
| 6,671,776 | B1 * | 12/2003 | DeKoning .................. | 711/114 |
| 6,671,820 | B1 * | 12/2003 | Kelman ..................... | 714/4 |
| 6,678,839 | B1 * | 1/2004 | Mori ........................ | 714/44 |
| 6,754,767 | B1 * | 6/2004 | Gold ......................... | 711/114 |
| 2001/0014956 | A1 * | 8/2001 | Nagata et al. ............... | 714/8 |
| 2001/0044879 | A1 * | 11/2001 | Moulton et al. ............ | 711/114 |
| 2002/0191537 | A1 * | 12/2002 | Suenaga ..................... | 370/221 |
| 2003/0041283 | A1 * | 2/2003 | Murphy et al. ............. | 714/13 |
| 2003/0079156 | A1 * | 4/2003 | Sicola et al. ................ | 714/4 |
| 2003/0131291 | A1 * | 7/2003 | Morrison et al. ........... | 714/54 |
| 2003/0237017 | A1 * | 12/2003 | Jibbe ......................... | 714/4 |

OTHER PUBLICATIONS

Fortra, Fibre Channel JBOD, 10-bay Tower & Rackmount Enclosures—Installation Guide, 1999, JMR Electronics Inc.

* cited by examiner

Primary Examiner—Robert Beausoliel
Assistant Examiner—Micheal Maskulinski
(74) Attorney, Agent, or Firm—Patent Law Group LLP (57) ABSTRACT

A data storage system includes controller nodes and a storage component. The controller nodes couple the storage component to a host. The storage component includes a controller and sleds with disk drives. The host and the storage component form an arbitrated loop. When the arbitrated loop is down, the controller removes the storage component from the arbitrated loop so the controller, the sleds, and the disk drives form an internal loop. When the internal loop is also down, the controller tests each of the sleds individually and marks those that are not responding properly. If a sled is responding properly the controller tests each of the drives in that sled individually and marks those that are not responding properly. The controller adds back into the internal loop the sleds and the drives that are not marked as bad, and then the storage component back into the arbitrated loop.

14 Claims, 5 Drawing Sheets

DISCOVERY AND ISOLATION OF MISBEHAVING DEVICES IN A DATA STORAGE SYSTEM

BACKGROUND OF THE INVENTION

1. Field of the Invention

The present invention relates generally to the field of data storage and, more particularly, to continuous uninterrupted access of the components of a data storage system.

2. Related Art

In the context of computer systems, enterprise storage architectures provide mass electronic storage of large amounts of data and information. The frenetic pace of technological advances in computing and networking infrastructure—combined with the rapid, large-scale sociological changes in the way the way these technologies are used—has driven the transformation of enterprise storage architectures faster than perhaps any other aspect of computer systems. This has resulted in a variety of different storage architectures, such as, for example, direct attached JBODs (Just a Bunch Of Disks), SAN (Storage Area Network) attached JBODs, host adapter RAID (Redundant Array of Inexpensive/Independent Disks) controllers, external RAID controllers, redundant external RAID controllers, and NAS (Network Attached Storage).

Enterprise architectures may utilize disk storage systems to provide relatively inexpensive, non-volatile storage. Disk storage systems have a number of problems. These problems include the following. Disk systems are prone to failure due to their mechanical nature and the inherent wear-and-tear associated with operation. Any number of components or devices may fail within a distributed storage system. Aside from the drives themselves, all of the other electrical circuits and network components may fail.

A failure of a crucial component in some storage systems, especially a network component or circuit, may shut down the entire system or result in lost data. Even minor failures may have disastrous results if not quickly addressed.

SUMMARY OF THE INVENTION

The present invention provides for a more robust and easily maintainable data storage system. The system comprises microprocessors distributed throughout the system that can detect and isolate problems. Problematic components within the data storage system are detected and removed from data transfer operations, while the data is rerouted to properly functioning components. Therefore, loss of data is avoided. Furthermore, when a problem is detected in a component, it can be placed offline before the problem is exacerbated with repeated data storage operations, perhaps extending the life of the component and of the entire system. In addition to the tremendous benefit of uninterrupted data storage with minimized risk of lost data, the serviceabilty of the data storage system is increased. Instead of having to replace a malfunctioning part immediately, the part may be taken offline, and may be serviced during a periodic inspection at a later, more convenient date when other servicing of the system is scheduled, and when other malfunctioning components may be simultaneously attended to.

Other aspects and advantages of the present invention will become apparent from the following descriptions and accompanying drawings.

BRIEF DESCRIPTION OF THE FIGURES

For a more complete understanding of the present invention and for further features and advantages, reference is now made to the following description taken in conjunction with the accompanying drawings, in which.

DETAILED DESCRIPTION

The system and method of device abstraction of the present invention can work with any networked memory components. One such network that it will work with is described in order to provide the reader with an illustration of an environment for a data storage system where the invention would be particularly advantageous. It should, however, be understood that the invention is not limited to the particular environment and storage system described, but is widely applicable in many diverse environments.

Various modifications or adaptations of the methods and or specific structures of the embodiments described may become apparent to those skilled in the art. All such modifications, adaptations, or variations that rely upon the teachings of the present invention, and through which these teachings have advanced the art, are considered to be within the scope of the present invention. Hence, these descriptions and drawings are not to be considered in a limiting sense, as it is understood that the present invention is in no way limited to the embodiments illustrated.

Environment For a Data Storage System

Figure 1:
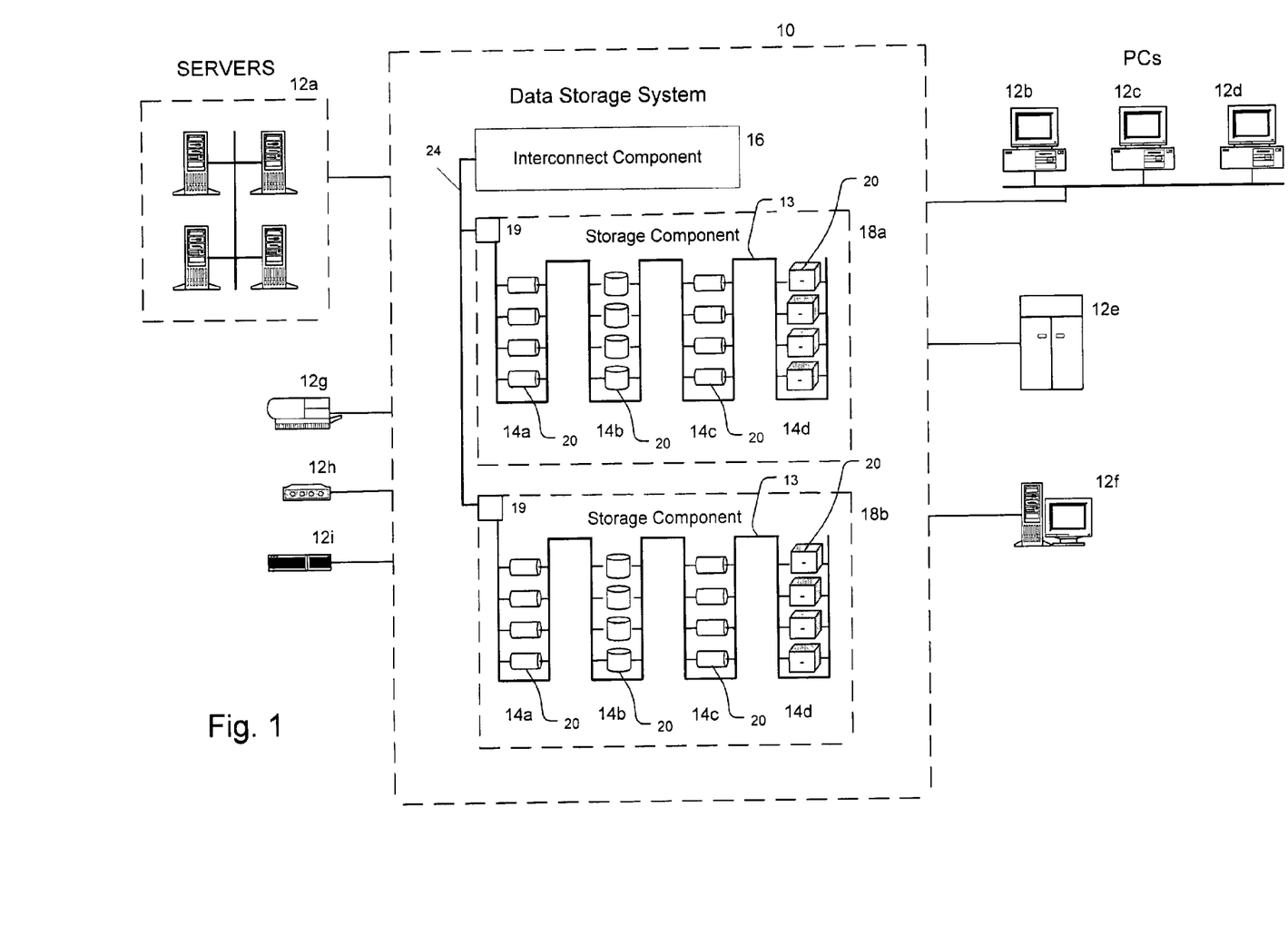
FIG. 1 illustrates an environment in which a data storage system according to an embodiment of the present invention may operate.

FIG. 1 illustrates an environment in which a data storage system 10 according to an embodiment of the present invention may operate. In general, data storage system 10 functions to provide mass storage for data and information routed, generated, manipulated, processed, or otherwise operated upon, by various host devices 12.

As depicted, these host devices 12 can include various processing devices, such as, for example, a server cluster 12a, one or more personal computers 12b, 12c, and 12d, a mainframe 12e, and a server tower 12f. Host devices 12 may also include various peripheral devices, such as, for example, a printer 12g, a modem 12h, and a router 12i. Each of these host devices 12 is connected to data storage system 10. As used herein, the terms "connected" or "coupled" mean any connection or coupling, either direct or indirect, between two or more elements; such connection or coupling can be physical or logical.

Data storage system 10 includes an interconnect component 16 and one or more storage components 18. In this example, two storage components 18a and 18b are shown. Interconnect component 16 generally allows host devices 12 to store and retrieve information from storage component 18. In one embodiment, interconnect component 16 is a modular architecture that is readily scaled from one up to many computer access nodes. Each node may be associated with one or more particular storage devices in storage components 18.

Storage components 18 provide mass storage for data and information. Storage components 18 can be implemented with any suitable mass storage resource, such as tape or disk storage. In one embodiment, as shown, storage components 18 include a number of storage devices 20, (only a portion of which, for clarity, are labeled FIG. 1). In one embodiment, each storage component 18 may include a JBOD (Just a Bunch of Disks) facility comprising a plurality of disk drives. The disk drives can be mounted in one or more rack-mountable storage shelves, each of which has one or more hot-pluggable disk drive sleds 14 (separately labeled 14a, 14b, 14c, and 14d). Each sled 14 may accommodate four disk drives on a pair of fibre channel (FC) connections 13. For each storage component 18, the sleds 14 can be configured in one of two possible ways: (1) all sleds on the same redundant FC connections 13 (as shown in FIG. 1), or (2) half of the sleds 14 on one set of redundant FC connections 13 and the other half of the sleds 14 on another set of redundant FC connections 13. The storage devices on the FC connection 13 may function according to a Fiber Channel Arbitrated Loop (FCAL) specification. This may be accomplished with firmware on the JBOD facilities. This firmware is stored in flash memory read by controllers 19. The flash memory is preferably located on a within the controller or on the same board that houses the controller, so that it may be accessed even when FC connection 24 is down, but may be located anywhere within data storage system 10.

The storage components 18 each include a controller chip 19 connected to FC connections 13. Each of the storage components 18 may be connected in a daisy chain fashion to each of the other storage components through controller chip 19 and to interconnect component 16 with FC connection 24. The controller chip 19 manages the flow of data to and from the storage devices 20, and also serves to monitor the storage devices 20 and the other components within storage components 18 such as, but not limited to the FC connections 13 and other related circuitry within the storage components 18.

As further described herein, data storage system 10 implements or incorporates a scalable architecture particularly well suited for communication-intensive, highly available data storage, processing, or routing. This architecture may be used for a number of applications and can provide a high performance, highly available, scalable, flexible, and cost-effective storage array.

With the scalable architecture of data storage system 10, users (e.g., businesses) may begin with small configurations of data storage initially and later, when necessary, may expand to extremely large configurations. This expansion can be done without bringing down data storage system 10, changing system architectures, or drastically altering the basic infrastructure of the computing environment supported by data storage system 10. Additional storage components 18 and nodes 22 (FIG. 2) may be added at any time.

Interconnect Component

Figure 2:
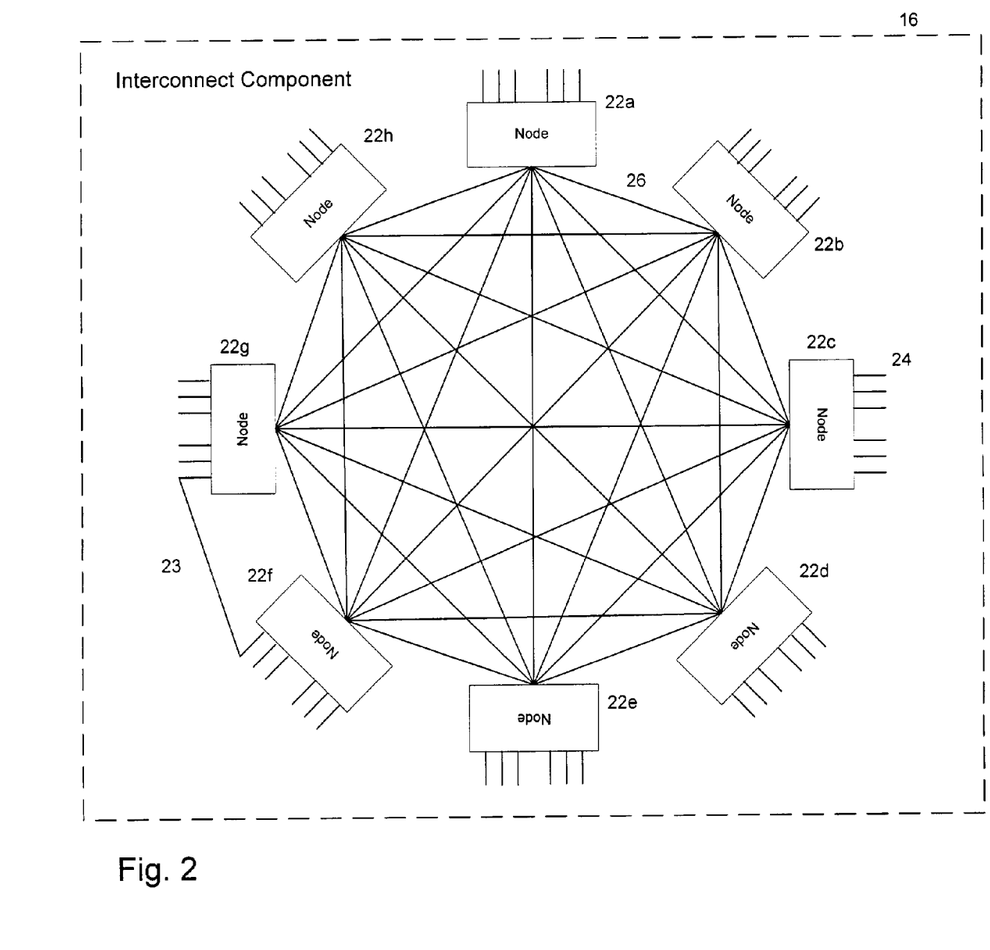
FIG. 2 is a block diagram of interconnect component 16 of FIG. 1.

FIG. 2 is a block diagram for interconnect component 16, according to an embodiment of the present invention. Interconnect component 16 may include a number of processing nodes 22 connected together by communication paths 26.

As depicted, nodes 22 are separately labeled as 22a, 22b, 22c, 22d, 22e, 22f, 22g, and 22h. Each node 22 generally functions as a point of interface/access for one or more host devices 12 and storage devices 20 (FIG. 1). For this purpose, in one embodiment, each node 22 may include one or more peripheral component interconnect (PCI) slots, each of which supports a respective connection 24. Each connection 24 can connect a host device 12 or a storage device 20. Connections 24 can be small computer system interface (SCSI), fibre channel (FC), fibre channel arbitrated loop (FCAL), Ethernet, Infiniband, or any other suitable connection. According to some embodiments, an interface component may be implemented or reside at one or more nodes 22 for facilitating the access to the various storage devices 20 which can make up data storage system 10.

In one embodiment, each host device 12 and storage device 20 has two separate connections 24 to interconnect component 16. In each such pair of connections 24, one connection 24 couples the respective host/storage device to one node 22 and the other connection 24 couples the respective host/storage device to another node 22. One of these two nodes 22 is designated as the "primary node" for the host/storage device, while the other node 22 is designated as the "secondary node." In normal operation, in one embodiment, the primary node performs all accesses to the respective host/storage device; the secondary node takes over only if the primary node fails. In an alternative embodiment, the primary node and the secondary node are simultaneously active to perform accesses. Both embodiments provide redundancy and fault tolerance so that the failure of any particular node 22 does not result in loss of connection to the host devices 12 and storage devices 20 connected to that node 22.

Each node 22 may include its own separate cluster memory (not expressly shown in FIG. 2). Each cluster memory buffers the data and information which is transferred through the respective node 22. Each cluster memory can also serve to buffer the data/information transferred through one or more other nodes 22, as described below in more detail. Thus, taken together, cluster memory in the nodes 22 is used as a cache for reads and writes into storage component 18. Cluster memory can be implemented as any suitable cache memory, for example, synchronous dynamic random access memory (SDRAM).

Communication paths 26 (only one of which is labeled for clarity) connect nodes 22 together. As shown, communication paths 26 connect any given node 22 with every other node 22 of interconnect component 16. That is, for any given two nodes 22, a separate communication path 26 is provided. Each communication path 26 may be implemented as a high-speed, bi-directional link having high bandwidth to provide rapid transfer of data and information between nodes 22. In one embodiment, the links can be two-bytes wide and operate at 266 MHz in each direction, for a total bandwidth of 1,064 MB/s per link. Control of data/information transfers over each communication path 26 is shared between the two respective nodes 22.

Node

Figure 3:
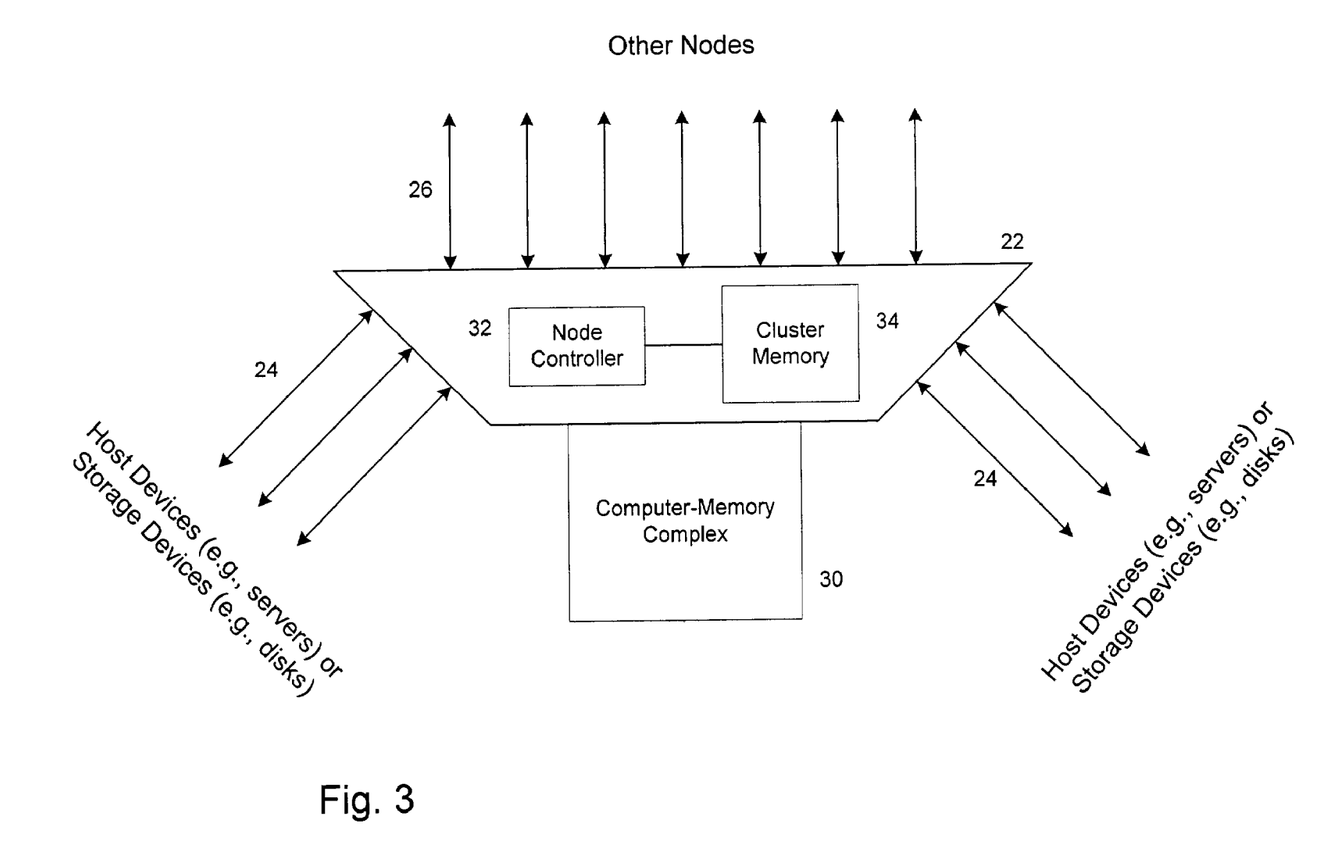
FIG. 3 is a simplified block diagram for a node 22, according to an embodiment of the present invention.

FIG. 3 is a block diagram of a node 22, according to an embodiment of the present invention. Node 22 supports connections 24 for connecting host devices 12 and storage devices 20, and communication paths 26 for communicating with other nodes 22. As depicted, node 22 can be implemented with a computer-memory complex 30, a node controller 32, and a cluster memory 34.

Computer-memory complex 30 can be a computer system which includes one or more central processing units (CPUs) and associated memory running an independent copy of an operating system. Computer-memory complex 30 functions to support, control, or otherwise manage one or more suitable buses through which data and information can be transferred via connections 24. In one embodiment, each such bus can be a peripheral component interconnect (PCI) bus. Computer-memory complex 30 may also support other functions, such as, for example, a hypertext transport protocol (HTTP) service, a network file system (NFS) service, and a common Internet file system (CIFS) service. An embodiment of computer-memory complex 30 is described below in more detail.

Node controller 32 and cluster memory 34 are distinct and separate from computer-memory complex 30. Node controller 32 may cooperate with computer-memory complex 30 but, to some degree, operates independently of the same. That is, computer-memory complex 30 may program node controller 32. Node controller 32, as programmed, can then operate independently on data, thereby providing overall control for the transfer of data through node 22. Accordingly, computer-memory complex 30 is not burdened with the task of performing actual operations on the data. Cluster memory 34 is coupled to node controller 32 and, as described herein, generally functions to cache data and information being transferred through node 22. With cluster memory 34, data/information being transferred through node 22 does not have to be temporarily stored in computer-memory complex 30. Thus, by reducing the workload and responsibilities of computer-memory complex 30, node controller 32 and cluster memory 34 facilitate and optimize the transfer of data and information through node 22.

In one embodiment, transfers of data/information can occur directly between the cluster memories 34 on two nodes 22. The high bandwidth of communication paths 26 allows very efficient communication between nodes 22. Furthermore, these direct transfers between any two given nodes 22 can be under the control of one or both of the respective node controllers 32. Thus, such direct transfers do not consume any PCI bandwidth or CPU/memory bandwidth of any computer-memory complex 30.

This ability to let bulk data transfer bypass the general purpose computer-memory complex 30 is advantageous. It enables the transfer of data/information at tremendous bandwidth. Furthermore, because the computer-memory complex 30 complex is less loaded, it is more available to provide or support other functions, such as, for example, a HTTP service, a NFS service, and a CIFS service.

Further details for node 22 and other aspects of the data system 10 are provided in U.S. patent application Ser. No. 09/633,088 entitled "Data Storage System," and to U.S. patent application Ser. No. 09/751,649 entitled "Communication Link Protocol Optimized For Storage Architectures," which are assigned to the same Assignee hereby incorporated by this reference in their entirety.

Figure 4:
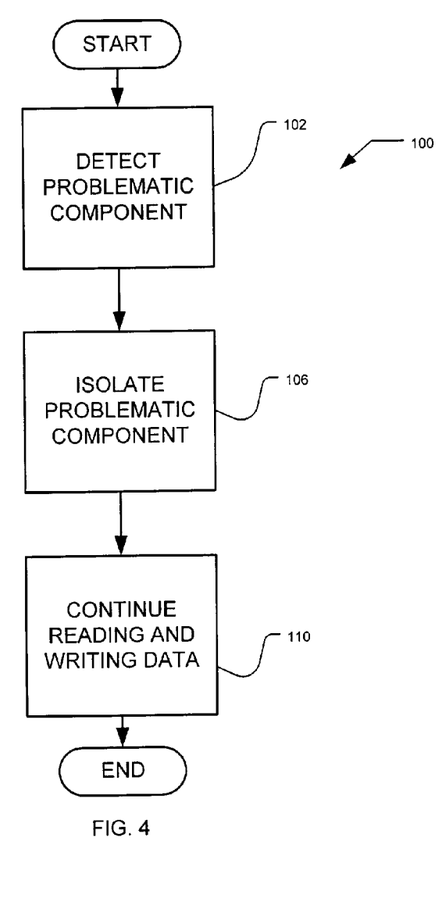
FIG. 4 is a general flow chart of the detection and isolation process, according to an embodiment of the present invention.

FIG. 4 is a flowchart illustrating a method 100 of the present invention. Data storage system 10 is an extremely robust system that is capable of continuous operation even if defective devices are present in the system. The distributed control system described herein includes processing capacity throughout the system that may be used to isolate the defective devices and seamlessly reroute the data for storage elsewhere. The system transfers data from a first high level processor to one or more second level processors. The second level processors decide to distribute the data among a plurality of storage devices. The second level processor can isolate defective devices including, for example, storage devices on a FCAL, or any other devices that may impede the flow of data.

In one embodiment, the logic for the method 100 may be performed by the firmware for controlling JBODs in the storage components 18 of the data storage system 10. This firmware may monitor the operational status of the FCALs.

In step 102, the firmware detects a defective device within the data storage system 10. Controller 19 within storage components 18, or node 22 of interconnect component 16 sends any command to a device within the storage component 18. It will do this one or more times, preferably three times. A device may have five or more phases: the command phase; controller on the data phase; the respond phase; and the abort phase. If the device queried does not respond—i.e. it is not in the respond phase after it receives the command—the firmware will then query a subsequent device. If the subsequent device does not respond, to one or more queries, the controller or firmware will assume that the connection or loop 13 is "down" or malfunctioning.

At step 104, the problematic component is isolated. In particular, if the loop is down, the particular storage device can be removed entirely from the system, i.e. no data will be sent or received to or from it.

Next, the storage component 18 having one or more defective storage devices 20 is analyzed. Controller 19 of the particular storage component 18 will query each of the devices 20 within the storage component 18 one or more times. If the device responds to the one or more queries, then it is determined that the problem resides outside of the that particular storage component. If the device does not respond to the one or more queries, i.e. if the device is not in the respond phase, the device itself is deemed problematic, and the controller 19 will reroute the data, so data will no longer be sent to the problematic device, but will be sent instead to other of the storage devices 20 of storage component 18. This is illustrated as step 106 of FIG. 4. If the problematic component or device, is other than a drive, for instance if it is a repeater, controller chip, or other circuitry of system 10, a string of drives or a sled (4 drives), or the entire storage component having the problematic component may be bypassed. Once the problematic device or devices are isolated, and actually, during the detection of the problematic device, the system can continue or resume the transfer of data to the other storage components and drives at step 110, depending upon the extent of the isolation and bypass. In other words, a problem may be detected in one storage component 18 while data transfer continues in another storage component 18. Also, within a particular storage component 18, data may be transferred to the working drives and other components while a problematic drive or component is isolated.

What follows is some of the software code involved in the aforementioned processes. The functionality of the code will be described with regard to the flowchart of FIG. 5.

Step 504—Signal Processing to Handle Misbehaving Devices

Figure 5:
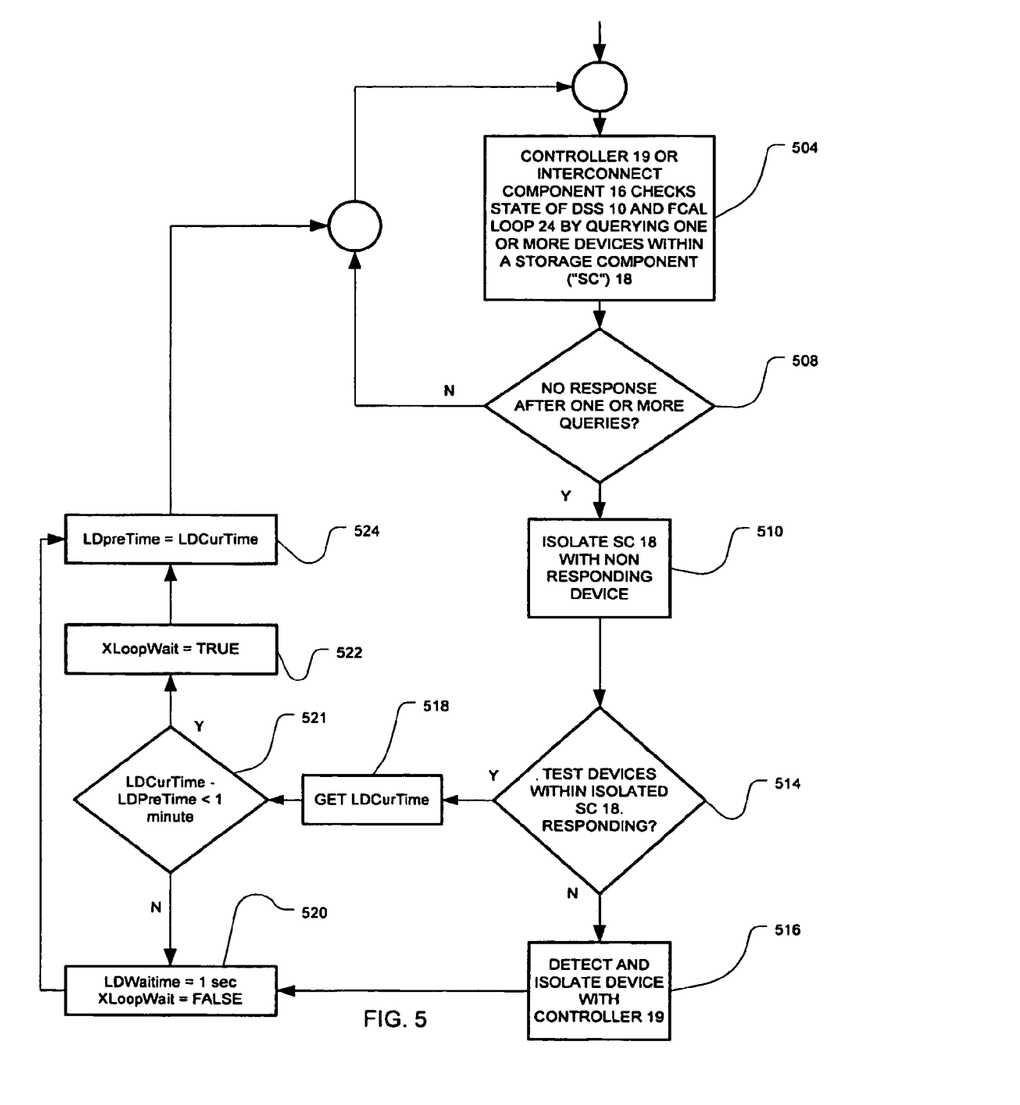
FIG. 5 is a detailed flow chart of the detection and isolation process referring to the code and the code variables, according to an embodiment of the present invention.

Inside signal detection and configuration routine:
```
Static uint32 FirstEnterWaitime=0;
Static uint8 IsFirstEnterWaitime=True
Uint32 curEnterwaitime;
Detect signal at connectors by reading input from
   VSC7130 devices on FC-AL Board
If (good signal) {
  If (XloopWait) {
    If (IsFirstEnterWaitime) {
    FirstEnterWaitime=get current system time;
    IsFirstEnterWaitime=False;
      Return; // loop is still closed
  }
    curEnterWaitime=get current system time
```

```
If      ((curEnterWaitime−FirstEnterWaitime)>=LD-
    Waitime) {
  LDWaitime=LDWaitime * 2;
  If (LDWaitime >=MAX_LD_WAITIME) {
    LDWaitime=MAX_ID_WAITIME;
  }
  XloopWait=FALSE;
  Open loop (allow 3PAR Nodes/Hosts see JBOD)
  IsFirstEnterWaitime=True
  LDPreTime=curEnterWaitime;
  }
} else {
  open loop (allow 3PAR Nodes/Hosts see JBOD)
  }
}else {
  close loop (standalone JBOD; 3PAR Nodes/Hosts
    could not see JBOD)
}
```

Step 516—Detection and Removal of Malfunction Devices

```
1. Bypass all current in loop DSBs and hard drives
2. For (each previous in loop DSB) {
    Put DSB back on loop.
    Generate Loop Initialization Process (LIP) to test current
      DSB
    If (LIP completed within time allowed) {
    This current DSB is good and is still in loop
    For (each previous in loop hard drive on this DSB) {
      Put the current hard drive back on loop
      Generate LIP to test the current hard drive
      If (LIP completed within time allowed) {
        This current hard drive is good and is still in loop
      } else {
        Bypass this hard drive (not in loop)
        Mark this drive bad (caused FCAL loop down)
      }
    }
  } else {
  Bypass this DSB (all drives on this DSB are automatically
    not in loop)
  Mark this DSB bad (caused FCAL loop down)
  }
}
```

The following variables seen in the code and flowchart of FIG. 5 have the following initial values: LDWaitime=one second; LDPreTime=0; LDCurTime=0, XloopWait=FALSE; MAX_LD_WAITIME=120 seconds.

Referring to FIG. 5, in step 504 the signal processing routine 504, as shown above, detects and configures devices based on the devices current state. Controller 19 within storage component 18, or node 22 of interconnect component 16, checks the state of data storage system ("DSS") 10 and FCAL loop 24 by querying the devices within a selected storage component ("SC") 18. In step 508, if the queried device does not respond to one or more queries, the system will proceed to step 510. If all devices respond to all queries the signal processing code and routine will continue monitoring the devices. There are assumed to be one or more problematic devices within DSS 10 if one or more queried devices do not respond to the queries sent to it. In the preferred embodiment, if two devices do not respond the one or more queries made of them, loop 24 is assumed to be down.

In step 510 the system isolates the SC 18 with the non responding device. Then, in step 514, the controller 19 within the isolated SC 18 again queries the non responding devices. If the devices now respond, the isolated SC 18 is determined to be functioning properly, and the problem that led to the initial non responses detected in steps 504 and 508 is determined to lie outside of the isolated SC 18. If the devices do respond, the system will get the variable LDCurTime in step 518, and then proceed to step 521.

The following variables in the code and flowchart of FIG. 5 have the following initial values: LDWaitime=one second; LDPreTime=0; LDCurTime=0, XloopWait=FALSE; MAX_LD_WAITIME=120 seconds.

In step 521, the system will check if LDCurTime minus LDPreTime is less than one minute. If it is not, the system will proceed to step 520 and LDWaitime will be set to one second, and XLOOPWait will be set to FALSE. If LDCurTime minus LDPreTime is less than one minute, the system will proceed to step 522, and the variable XloopWait will be se to TRUE. Then, in step 524 the variable LDPreTime will be set to equal the variable LDCurTime. The system will then return to the signal processing routine of step 504.

If the devices do not respond again in step 514, they are therefore confirmed to be defective and they are isolated within the SC 18 in step 516. After that, in step 520, LDWaitime will be set to one second, and XLOOPWait will be set to FALSE. After step 520, the system will proceed to step 524 where the variable LDPreTime will be set to equal the variable LDCurTime. The system will then return to the signal processing routine of step 504.

While embodiments of the present invention have been shown and described, changes and modifications to these illustrative embodiments can be made without departing from the present invention in its broader aspects. Thus, it should be evident that there are other embodiments of this invention which, while not expressly described above, are within the scope of the present invention and therefore that the scope of the invention is not limited merely to the illustrative embodiments presented. Therefore, it will be understood that the appended claims set out the metes and bounds of the invention. However, as words are an imperfect way of describing the scope of the invention, it should also be understood that equivalent structures and methods while not within the express words of the claims are also within the true scope of the invention.

The invention claimed is:

1. A method for a storage component controller in a data storage system to isolate misbehaving devices in an arbitrated loop, the data storage system comprising at least two controller nodes and at least one storage component, the controller nodes coupling the storage component to a host device, the storage component comprising the storage component controller and disk drive sleds, the disk drive sleds comprising disk drives, the arbitrated loop comprising the host device and the storage component, the method comprising:
   determining if the arbitrated loop is down;
   if the arbitrated loop is down:
      removing the storage component from the arbitrated loop, wherein the storage component controller, the disk drive sleds, and the disk drives form an internal loop;
   determining if the internal loop is down;
   if the internal loop is down:
      bypassing the disk drive sleds and the disk drives from the internal loop;
      testing each of the disk drive sleds individually;
      if a disk drive sled is not responding properly, marking that disk drive sled as bad;
      if a disk drive sled is responding properly:

testing each of the disk drives in that disk drive sled individually;
if a disk drive in that disk drive sled is not responding properly, marking that disk drive as bad;
adding back into the internal loop the disk drive sleds and the disk drives that are not marked as bad;
adding the storage component back into the arbitrated loop so the internal loop rejoins the arbitrated loop.

2. The method of claim 1, wherein said determining if the arbitrated loop is down comprises:
sending communications to a disk drive in the arbitrated loop;
determining if the disk drive fails to respond properly; and
repeating said sending and determining, wherein the arbitrated loop is down if the disk drive fails to respond properly three consecutive times.

3. The method of claim 1, wherein said determining if the arbitrated loop is down comprises:
sending communications to two disk drives in the arbitrated loop;
determining if the two disk drives fail to respond properly; and
repeating said sending and determining, wherein the arbitrated loop is down if the two disk drives fail to respond properly three consecutive times.

4. The method of claim 1, wherein said determining if the internal loop is down comprises:
sending communications to a disk drive in the arbitrated loop;
determining if the disk drive fails to respond properly; and
repeating said sending and determining, wherein the arbitrated loop is down if the disk drive fails to respond properly three consecutive times.

5. The method of claim 1, wherein said determining if the internal loop is down comprises:
sending communications to two disk drives in the arbitrated loop;
determining if the two disk drives fail to respond properly; and
repeating said sending and determining, wherein the arbitrated loop is down if the two disk drives fail to respond properly three consecutive times.

6. The method of claim 1, further comprising:
after said adding the storage component back into the arbitrated loop, determining if the arbitrated loop is still down;
if the arbitrated loop is still down, removing the storage component from the loop.

7. The method of claim 1, wherein the storage component further comprises a repeater that forms part of the internal loop and is associated one of the disk drive sleds, the method further comprises:
testing the repeater individually;
if the repeater is not responding properly, marking the associated disk drive sled as bad and do not add the associated disk drive sled back into the internal loop.

8. A data storage system, comprising:
at least one storage component, the storage component comprising a storage component controller and disk drive sleds, the disk drive sleds comprising disk drives;
at least two controller nodes, the controller nodes coupling the storage component to a host device;
wherein:
the host device and the storage component form an arbitrated loop;
the storage component controller comprises a memory storing firmware comprising instructions for:
determining if the arbitrated loop is down;
if the arbitrated loop is down:
removing the storage component from the arbitrated loop, wherein the storage component controller, the disk drive sleds, and the disk drives form an internal loop;
determining if the internal loop is down;
if the internal loop is down:
bypassing the disk drive sleds and the disk drives from the internal loop;
testing each of the disk drive sleds individually;
if a disk drive sled is not responding properly, marking that disk drive sled as bad;
if a disk drive sled is responding properly:
testing each of the disk drives in that disk drive sled individually;
if a disk drive in that disk drive sled is not responding properly, marking that disk drive as bad;
adding back into the internal loop the disk drive sleds and the disk drives that are not marked as bad;
adding the storage component back into the arbitrated loop so the internal loop rejoins the arbitrated loop.

9. The system of claim 8, wherein said determining if the arbitrated loop is down comprises:
sending communications to a disk drive in the arbitrated loop;
determining if the disk drive fails to respond properly; and
repeating said sending and determining, wherein the arbitrated loop is down if the disk drive fails to respond properly three consecutive times.

10. The system of claim 8, wherein said determining if the arbitrated loop is down comprises:
sending communications to two disk drives in the arbitrated loop;
determining if the two disk drives fail to respond properly; and
repeating said sending and determining, wherein the arbitrated loop is down if the two disk drives fail to respond properly three consecutive times.

11. The system of claim 8, wherein said determining if the internal loop is down comprises:
sending communications to a disk drive in the arbitrated loop;
determining if the disk drive fails to respond properly; and
repeating said sending and determining, wherein the arbitrated loop is down if the disk drive fails to respond properly three consecutive times.

12. The system of claim 8, wherein said determining if the internal loop is down comprises:
sending communications to two disk drives in the arbitrated loop;
determining if the two disk drives fail to respond properly; and
repeating said sending and determining, wherein the arbitrated loop is down if the two disk drives fail to respond properly three consecutive times.

13. The system of claim 8, the firmware comprising instructions for:
- after said adding the storage component back into the arbitrated loop, determining if the arbitrated loop is still down;
- if the arbitrated loop is still down, removing the storage component from the loop.

14. The system of claim 8, wherein the storage component further comprises a repeater that forms part of the internal loop and is associated one of the disk drive sleds, wherein the firmware further comprises instructions for:
- testing the repeater individually;
- if the repeater is not responding properly, marking the associated disk drive sled as bad and do not add the associated disk drive sled into the internal loop.

* * * * *